US008494466B2

(12) United States Patent
Jalloul et al.

(10) Patent No.: US 8,494,466 B2
(45) Date of Patent: Jul. 23, 2013

(54) SELECTING RECEIVER CHAINS OF A MOBILE UNIT FOR RECEIVING WIRELESS SIGNALS

(75) Inventors: Louay Jalloul, Santa Clara, CA (US); Sam P. Alex, Santa Clara, CA (US); Soumen Chakraborty, Santa Clara, CA (US); Sindhu Verma, Santa Clara, CA (US); Manish Airy, Santa Clara, CA (US); Anuj Puri, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1511 days.

(21) Appl. No.: 12/079,404

(22) Filed: Mar. 26, 2008

(65) Prior Publication Data
US 2009/0247091 A1 Oct. 1, 2009

(51) Int. Cl.
*H04B 17/02* (2006.01)

(52) U.S. Cl.
USPC ........... 455/135; 455/132; 455/133; 455/134; 455/137

(58) Field of Classification Search
USPC ........... 455/101, 102, 103, 107, 114.1, 115.1, 455/115.3, 115.4, 132–137, 13.3, 500, 501, 455/504, 506, 507, 513, 516–517, 67.11, 455/67.13, 67.7, 226.1, 226.2, 226.3, 226.4, 455/230, 68–69, 130
See application file for complete search history.

(56) References Cited

U.S. PATENT DOCUMENTS

| | | | | |
|---|---|---|---|---|
| 6,115,599 A * | 9/2000 | Stilp | | 455/404.1 |
| 6,389,085 B1 * | 5/2002 | Salt | | 375/347 |
| 6,622,013 B1 * | 9/2003 | Miyoshi et al. | | 455/277.2 |
| 6,850,741 B2 * | 2/2005 | Lei et al. | | 455/101 |
| 6,891,909 B2 * | 5/2005 | Hurley et al. | | 375/347 |
| 6,925,293 B2 * | 8/2005 | Lindenmeier et al. | | 455/276.1 |
| 7,432,857 B2 * | 10/2008 | Yamamoto et al. | | 342/374 |
| 7,483,718 B2 * | 1/2009 | Catreux-Erceg et al. | | 455/562.1 |
| 7,702,298 B2 * | 4/2010 | Barratt et al. | | 455/101 |
| 7,738,924 B2 * | 6/2010 | Nakao | | 455/562.1 |
| 8,036,711 B2 * | 10/2011 | Catreux-Erceg et al. | | 455/562.1 |
| 2002/0193146 A1 * | 12/2002 | Wallace et al. | | 455/562 |
| 2007/0224951 A1 | 9/2007 | Gilb et al. | | |
| 2008/0188183 A1 * | 8/2008 | Dwyer et al. | | 455/67.7 |
| 2009/0017766 A1 * | 1/2009 | Patel et al. | | 455/67.11 |
| 2009/0046786 A1 * | 2/2009 | Moulsley et al. | | 375/260 |
| 2009/0247091 A1 * | 10/2009 | Jalloul et al. | | 455/70 |
| 2010/0136933 A1 * | 6/2010 | Rofougaran | | 455/126 |
| 2011/0053527 A1 * | 3/2011 | Hunzinger | | 455/101 |

* cited by examiner

*Primary Examiner* — Pablo Tran
(74) *Attorney, Agent, or Firm* — Sterne, Kessler, Goldstein & Fox PLLC

(57) ABSTRACT

A method and apparatus of selecting which of a plurality of receiver chains of a mobile unit to receive wireless signals, is disclosed. One method includes measuring a first receive signal quality while all of the plurality of receiver chains are receiving wireless signals, and measuring a second receive signal quality while a subset of the plurality of receiver chains are receiving wireless signals. The subset of the plurality of receiver chains are selected to receive wireless signal unless the first receive signal quality is a threshold better than the second receive signal quality. If the first receive signal quality is a threshold better than the second receive signal quality then all the plurality of receiver chains are selected to receive wireless signals.

26 Claims, 6 Drawing Sheets

SELECTING RECEIVER CHAINS OF A MOBILE UNIT FOR RECEIVING WIRELESS SIGNALS

FIELD OF THE DESCRIBED EMBODIMENTS

The described embodiments relate generally to wireless communications. More particularly, the described embodiments relate to methods and systems for selecting receiver chains of a mobile unit for receiving wireless signals.

BACKGROUND

Wireless devices can include fixed wireless devices or mobile wireless devices. Fixed wireless devices can include base stations and/or fixed location consumer-used devices. Fixed wireless devices typically have essentially unlimited power available since there are typically powered by an AC power source. Mobile wireless devices, however, are typically battery powered, and therefore, must conserve power usage in order to ensure a reasonable time of operation.

New wireless systems and standards, such as 802.16e or WiMAX are deploying devices with multiple antenna devices that can incorporate smart antenna technologies to improve the quality of wireless links between the wireless fixed and/or mobile devices. Multiple antenna device, however, typically dissipate more power than single antenna devices because multiple antenna devices generally require a receiver chain (amplifiers, local oscillators, and frequency mixers) for each of the antennas of the multiple antenna device.

Therefore, a conflict exits between the desire for less power dissipation of mobile units, and the desire to improve communication links of mobile unit through the use of multiple antennas.

It is desirable to have a system and method for reducing power consumption of multiple antenna mobile units of a wireless system while maintaining a desired level of performance.

SUMMARY

An embodiment includes a method of selecting which of a plurality of receiver chains of a mobile unit to receive wireless signals. The method includes measuring a first receive signal quality while all of the plurality of receiver chains are receiving wireless signals, and measuring a second receive signal quality while a subset of the plurality of receiver chains are receiving wireless signals. The subset of the plurality of receiver chains are selected to receive wireless signal unless the first receive signal quality is a threshold better than the second receive signal quality. If the first receive signal quality is a threshold better than the second receive signal quality then all the plurality of receiver chains are selected to receive wireless signals.

Another embodiment includes a method of selecting which of a plurality of receiver chains of a mobile unit to receive wireless signals. The method includes measuring a first receive signal quality while N of the plurality of receiver chains are receiving wireless signals. A second receive signal quality is measured while M of the plurality of receiver chains are receiving wireless signals. M receiver chains are selected to receive wireless signal unless the first receive signal quality is a threshold better than the second receive signal quality. However, if the first receive signal quality is a threshold better than the second receive signal quality then N of receiver chains are selected to receive wireless signals, wherein N>M.

Another embodiment includes a method of selecting which of a plurality of receiver chains of a mobile unit to receive wireless signals. The method includes the mobile unit sensing a mobile unit condition not related to reception of wireless signals. The subset of the plurality of receiver chains is selected to receive wireless signal if the mobile unit condition exceeds a threshold. If the threshold condition falls below the threshold then all the plurality of receiver chains are selected to receive wireless signals. The mobile unit condition can include a level of battery power available, or a temperature level of the mobile unit.

Other aspects and advantages of the described embodiments will become apparent from the following detailed description, taken in conjunction with the accompanying drawings, illustrating by way of example the principles of the described embodiments.

DETAILED DESCRIPTION

Embodiments of methods of selecting which of a plurality of receiver chains of a mobile unit to receive wireless signals are disclosed. The number of receiver chains that are selected is dependent upon detecting a threshold difference in the quality of signals received by different numbers of receiver chains. Various operational parameters or signal quality characteristics of either the mobile unit or a transmitting base station can influence the value of the threshold.

Figure 1:
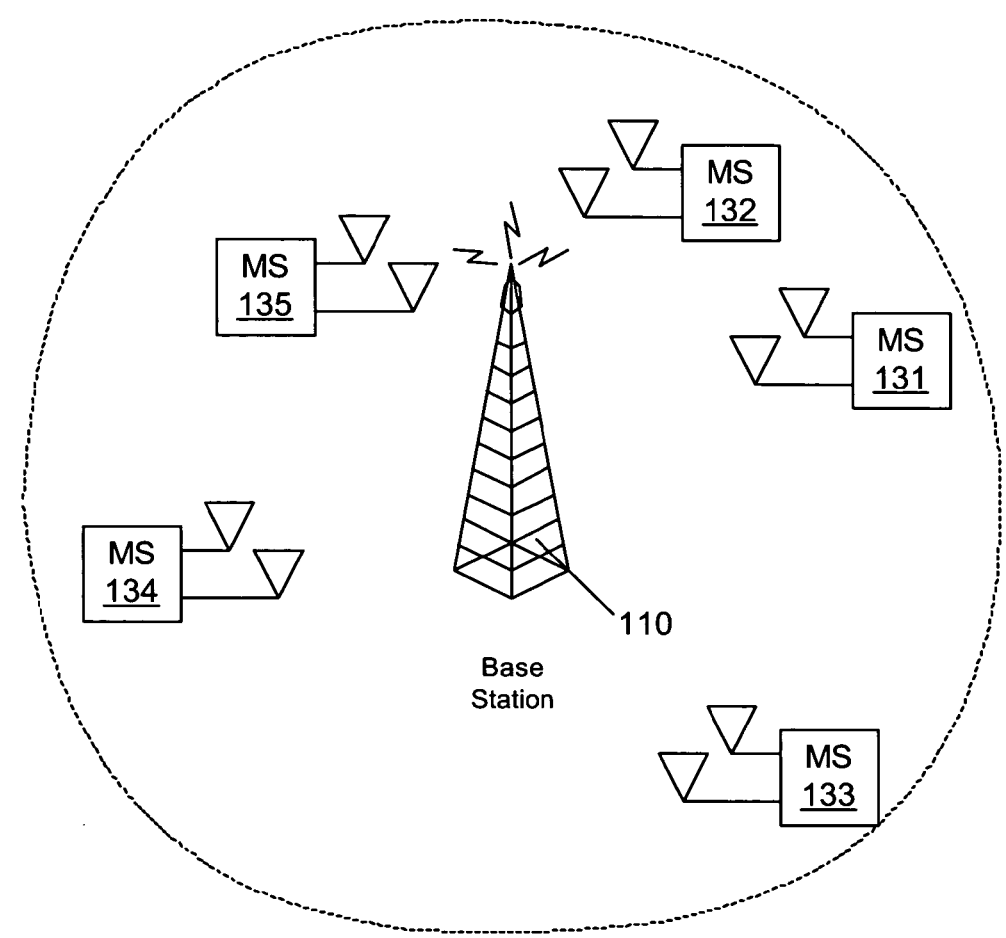
FIG. 1 shows an example of a wireless network that includes a base station that is wirelessly communicating with multiple antenna mobile units.

FIG. 1 shows an example of a wireless network that includes a base station 110 that is wirelessly communicating multiple antenna mobile units 120, 122, 124. As shown, the base station 110 transmits wireless signals that can be received by mobile units 131, 132, 133, 134, 135 located within a transmission range or cell as shown.

If a mobile unit is located within the transmission range or cell, generally the mobile unit can successfully receive wireless signals from the base station 110. However, the signal quality of the receive signal can vary depending on the location of the mobile unit within the transmission range or cell. More specifically, the transmission signal of the base station typically is attenuated as the transmission signal propagates away from the base station. Therefore, the amplitude of the received transmission signal is typically much greater when the mobile unit is proximate to the base station 110 than when the mobile unit is located near the edge of the transmission range or cell.

For example, the mobile units 132, 135 are located near the base station 110, and therefore, probably receive signals from the base station 110 having a relatively high signal level. The relatively high signal level typically ensures the received signals have a relatively high CINR (carrier to interference plus noise ratio). However, the mobile unit 133 is located near the outer edge of the cell of the base station 110, and therefore, probably receives signals from the base station 110 having a relatively low signal level and CINR.

Mobile units receiving signals having relatively higher CINRs can support higher data rates than mobile units receiving signals having relatively low CINRs. Therefore, based on receive signal CINRs, the data rates that can be supported by the mobile units vary depending upon where the mobile unit is located with respect to the base station.

It has been well established that the use of multiple or additional antennas and receiver chains can be used to improve the data rates of receive signals. That is, for example, smart antenna techniques, such as, receive diversity and spatial multiplexing can be utilized by multiple antenna receivers to improve the data rates of wireless signal transmitted to the multiple antenna receivers. Therefore, smart multiple antenna techniques can be used to improve, for example, the data rates of mobile units that are located farther away from a base station.

Figure 2:
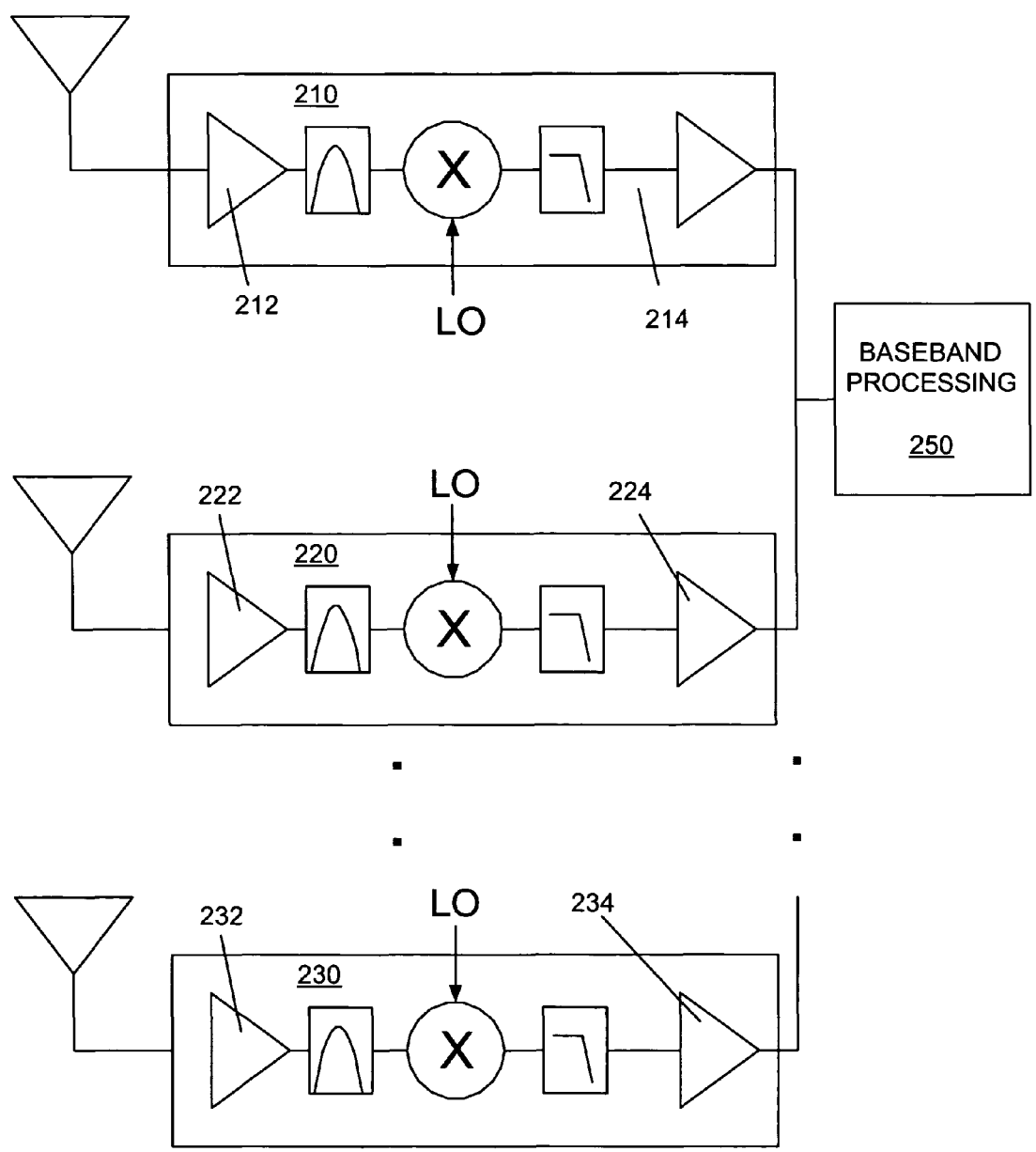
FIG. 2 shows an example of multiple receiver chains of a multiple antenna mobile unit.

As previously described, however, multiple antenna receivers typically require a receiver chain for each receive antenna. FIG. 2 shows an example of multiple receiver chains of a multiple antenna mobile unit. Each of the receiver chains 210, 220, 230 includes at least a couple of amplifiers 212, 214, 222, 224, 232, 234 and a frequency translator 214, 224, 234. Typically, each receive chain includes a band pass filter after the first amplifier (for example, amplifiers 212, 222, 232), and a low pass filter after the frequency translator. Clearly, the more receiver chains that are activated by the mobile unit for reception of wireless signals, the greater the power dissipated by the mobile unit to power the active devices of the receiver chains.

Figure 3:
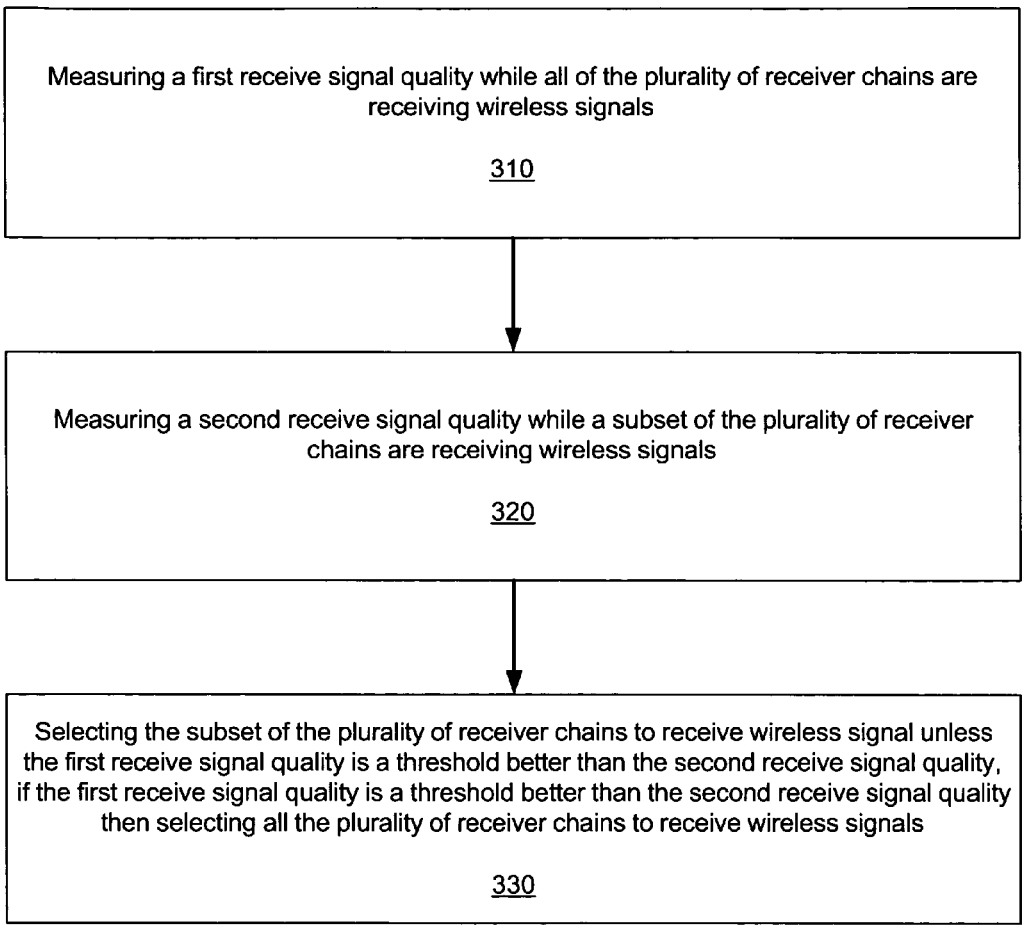
FIG. 3 is a flow chart that includes steps of one example of a method of selecting which of a plurality of receiver chains of a mobile unit to receive wireless signals.

FIG. 3 is a flow chart that includes steps of one example of a method of selecting which of a plurality of receiver chains of a mobile unit to receive wireless signals. A first step 310 includes measuring a first receive signal quality while all of the plurality of receiver chains are receiving wireless signals. A second step 320 includes measuring a second receive signal quality while a subset of the plurality of receiver chains are receiving wireless signals. A third step 330 includes selecting the subset of the plurality of receiver chains to receive wireless signal unless the first receive signal quality is a threshold better than the second receive signal quality, if the first receive signal quality is a threshold better than the second receive signal quality then selecting all the plurality of receiver chains to receive wireless signals.

Different methods and measurements can be used to determine whether the first receive signal quality is a threshold better than the second receive signal quality. Additionally, the threshold can be adjusted based on at least one of several different factors.

One embodiment includes determining a first modulation and coding format that the first receive signal quality enables the use of, and determining a second modulation and coding format that the second receive signal quality enables the use of. The first receive signal quality can be determined to be the threshold better than the second receive quality if a data throughput supported by the first modulation and coding format is a predetermined percentage greater than a data throughput supported by the second modulation and coding format. Basically, the use of less than all the receiver chains are selected to receive the wireless signals, unless receiving wireless signals through all of the receiver chains provides a data throughput that is at least the threshold better than the data throughput provided by receiving the wireless signals through less than all of the receiver chains.

Another embodiment includes selections between N receiver chains and M receiver chains rather than just between all receiver chains and a subset of receiver chains. However, the same basic selection conditions apply. That is, for example, a first signal quality measured while receiving through a first number of receiver chains is compared with a second signal quality measured while receiving through a second number of receiver chains. Comparing a difference between the first signal quality and the second signal quality with a predetermined threshold is used to determine the selection of either the N receiver chains or the M receiver chains, wherein N is greater than M. As described, the threshold can be adaptively adjusted based on at least one of several different parameters and/or conditions. One embodiment includes a graduated set of thresholds, in which the number of receiver chains selected varies depending upon, for example, the signal qualities measured for each of the combinations of receiver chains. The number of receiver chains can be adaptively selected base on the receive signal qualities of the combinations, and the amount of battery power available to the mobile unit.

Embodiments of the wireless signals include frames. More specifically, an embodiment of the frames of the wireless signals includes a preamble within each frame. The preamble includes known signal qualities and characteristics, such as, pilot tones and known data. A receiver can measure signal qualities of the received signal, and estimate the transmission channel between the transmitter and the receiver by comparing the measured signal qualities with the known characteristics of the transmitted signal. The preamble portions of the frames provide a desirable time to measure the signal quality of the receive signals. An embodiment includes the first receive signal quality and the second receive signal quality being measured during the preamble of received signals, and the number of receiver chains for receiving the signals selected.

The preambles of most wireless signals occur at the start of the frames. An advantage of performing the signal quality measurements during the preamble as opposed to during another portion of the frame (such as during control and/or data transmission) is that the benefits provided by the selection between the different number of receiver chains can be realized early in the frame. Therefore, the power dissipation versus transmission signal quality tradeoffs optimized for a greater amount of time.

Another embodiment includes the first receive signal quality and the second receive signal quality being measured once every k frames. Clearly, this requires less overhead than is required if the signal qualities were to be measured every frame. One other embodiment includes the value of k being adaptively selected based upon at least one characteristics of a transmission channel between the base station and the mobile unit. Once embodiment includes the value of k being adaptively selected based on a coherence time (Doppler shift) of the transmission channel. The coherence time provides an indication of how fast the transmission channel is changing.

Various receive signal quality parameters can be used for establishing (measuring) the first and second receive signal qualities. Some exemplary signal qualities that can be measured include spectral efficiency, CINR, CNR, PER, BER, BLER, energy consumed per receive bit, MAP error rate, and absolute CINR of the first receive signal quality.

The spectral efficiency can be particularly useful because it provides an indication of the data rates that can be sustained by the transmission signals between the transmitter and the different combinations of receiver chains of the multiple antenna receiver. Mathematically, the spectral efficiency of a MIMO (multiple input, multiple output) transmission signal can be estimated by:

$$\text{spectral efficiency} = \log_2(\det(I_{NR} + (\rho/NT)HH^*));$$

where I is an identity matrix, NR is the number of active receive antennas, NT is the number of active transmit antennas, $\rho$ is the receive signal CINR, H is an estimate of the channel between the transmitter and receiver which has the dimension of NR×NT, and H* is the Hermitian of H.

Another embodiment includes determining the spectral efficiency by referencing a look up table based on the measured CINR.

As previously described, the transmission channel can be estimated and the CINR measured during the preamble of a frame of the wireless transmission signal. The spectral efficiency can then be determined along with knowledge of the number of transmitter and receiver antennas.

An embodiment further includes estimating the spectral efficiency during the preamble of a frame, and then augmenting the estimate with additional knowledge obtained during the remaining duration of the frame. For example, additional signal quality information can be obtained during control signal and data transmission portions of the frame (more specifically, during the downlink portion of the frame). The additional signal quality information can augment or refine the spectral efficiency estimate. The possibility exists that the augmented spectral efficiency exceeds the predetermined threshold when the initial spectral efficiency did not, or the augmented spectral efficiency does not exceed the predetermined threshold when the initial spectral efficiency did.

Another embodiment includes the initial spectral efficiency being determined during single antenna transmission of the preamble of the frame, and the spectral efficiency being augmented during single antenna transmission of control information, and multiple antenna transmission during the data transmission portion of the frame. That is, the spectral efficiency is initially estimated with signal antenna transmission signals during the preamble of the frame, and the estimated spectral efficiency is augmented during single antenna and/or multiple antenna transmission later in the frame.

As previously described, the threshold can be adapted. For example, one embodiment includes the threshold being dependent upon an estimated amount of battery power available to the mobile unit. That is, for example, the threshold can be dynamically adjusted as the available battery power of the mobile unit changes.

An embodiment includes comparing CINR of the first receive signal quality with the CINR of the second receive signal quality. The threshold can be dynamically adjusted based on the amount of remaining battery life of the mobile unit. For example, if the remaining battery life of the mobile unit is low, the threshold can be selected to be relatively low, so that only one antenna and receiver chain is selected the majority of the time. However, if the battery life is sensed to be high, then the threshold can be set relatively high, and therefore, the likelihood of selecting two or more antennas for receiving wireless signals is greater, and will happen a greater percentage of the time.

Another embodiment includes the threshold being dependent upon an estimation of energy consumed per bit for receiving wireless signals through all of the plurality of receiver chains and an estimation of energy consumed per bit for receiving wireless signals through the subset of the plurality of receiver chains. The energy consumed per bit can be estimated by observing the modulation and coding for the different combinations of antenna and receiver activations, and dividing by the energy being consumed for the different combinations.

Embodiments include the base station that transmits the wireless signals initiating and/or maintaining at least some control over how many of the receive chains the mobile unit uses to receive wireless signals. Embodiments include the threshold being adaptively adjusted based upon characteristics of the base station that is transmitting the wireless signals. For example, one embodiment includes the threshold being dependent upon the loading of a base station that is transmitting the wireless signals. The loading of the base station can be determined by the number of mobile units (or more generally, users) being served or communicating with the base station, and by a level of interference observed during the uplink frame from other users of other cells.

Other embodiments include the threshold be adaptively selected based upon characteristics of the information being communicated by the wireless signals being received. For example, one embodiment includes the threshold being dependent upon latency and throughput requirements of the information of the received wireless signals. The latency and throughput can associated with the downlink and/or uplink transmission between the base station and the mobile unit. Some types of information being communicated (such as, voice data) is sensitive to latency and throughput of the uplink and/or downlink.

Other embodiments include the base station having at least some control over the number of receive chains the mobile unit uses to receive wireless signals based on feedback information provided by the mobile unit to the base station. For example, embodiments include the mobile unit reports its remaining battery power to the base station. As previously described, the receive chain activation can be based on, or adaptively adjusted based on the remaining battery power of the mobile unit. For this embodiment, the base station at least partially controls the threshold based on reported remaining battery power.

Embodiments include control of how the mobile unit reports information back to the base station. For one embodiment, the mobile unit reports the remaining battery life through a control channel, wherein the control channel includes a MAC layer packet sent by the mobile unit to the base station. For another embodiment, the mobile unit reports the remaining battery life through a control channel, wherein the control channel includes an application layer packet of a server associated with a network of the base station. To reduce the impact of the reporting on available bandwidth, an embodiment includes mobile unit periodically reporting the remaining battery life to the base station through the control channel.

An embodiment includes the signal qualities and/or channel qualities being reported from the mobile unit to the base station. Some wireless standards, such as, WiMAX include provisions for reporting channel qualities through a channel quality indicator. One specific implementation includes the mobile unit reporting channel quality (CQICH) to the base station. For an embodiment, the reported channel quality is for signal quality for reception of through a signal receiver chain. The reported channel quality can be for a single receiver chain even if multiple of the receiver chains are active.

Various embodiments address different ways the mobile unit receives instructions from the base station. One embodiment includes the mobile unit activating only the subset of receiver chains unless a transmitting base station indicates that the transmitting base station has data to transmit to the mobile unit. Another embodiment includes the mobile unit receiving a command from a transmitting base station that indicates to the mobile unit how many receiver chains to activate, and for how many frames of transmission of the wireless signals. That is, the mobile unit maintains reception over the number of receiver chains as indicated by the base station for a number of frames as indicated by the base station.

Another embodiment includes the mobile unit maintaining the number of receiver chains until the base station indicates a change. This can be advantageous because the base station transmits data to the mobile unit at the high data rate available with a greater number of receiver chains. The base station can then control when to reduce the number of receiver chains which support a lower data rate.

Another embodiment includes the mobile unit receiving a command from a transmitting base station. Upon receiving the command, the mobile unit periodically selecting a preset multiple of receiver chains to receive wireless signals for a predetermined duration, over a predetermined interval.

Another embodiment includes the mobile unit detecting a handoff condition. That is, the mobile unit determines that is should handoff wireless communication to a different base station for maintaining wireless communication. For this embodiment, if the mobile unit detects a handoff condition, the mobile unit selects all the plurality of receiver chains to receive wireless signals. This is desirable because, for example, the CINR of receive signals tends to be low in a handoff region. That is, the mobile is near an edge of a cell of the base station, and therefore, probably receiving relatively lower amplitude signal from the base station. The mobile unit can attempt to improve is receive signal quality (CINR) be activating and receiving over a greater number of receive antenna and receiver chains.

Another embodiment includes the mobile unit reporting channel quality to the base station, and the base station selecting all or a subset of the receiver chains based on the reported channel quality. The mobile unit can report the quality of one of the receiver chain settings (all or a subset), and the base station can infer what the quality would be for the other setting. For example, the base station can in some situations, infer a 3 dB improvement for a two receiver chain selection versus a one receiver chain selection. The base station can determine the receiver chain selection based on the reported channel quality and the inferred channel quality.

Figure 4:
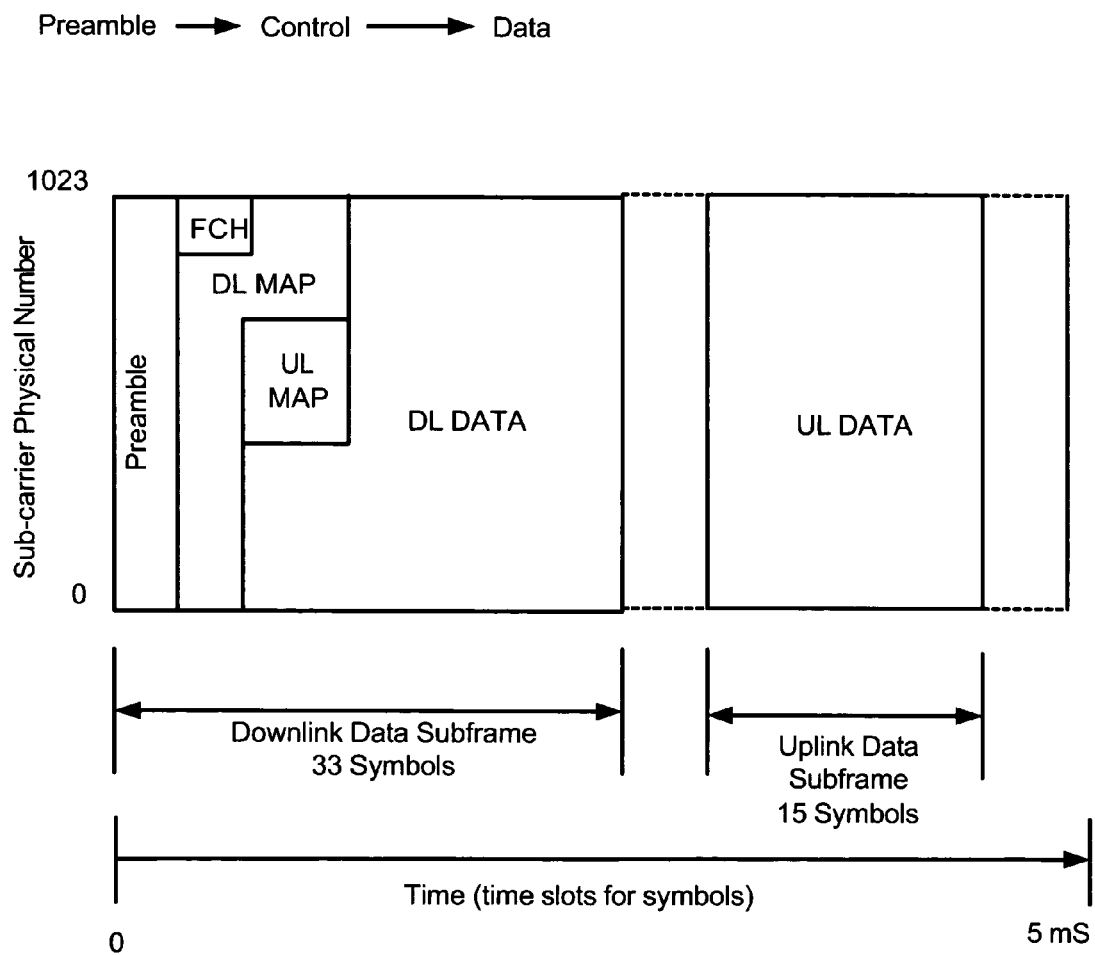
FIG. 4 shows a WiMAX frame that communicates information between a base station and mobile units, and includes a preamble.

FIG. 4 shows a WiMAX frame that communicates information between a base station and mobile units. As shown, a downlink frame includes 33 multiple carrier symbols, and an uplink frame includes 15 multiple carrier symbols. Each multi-carrier symbol includes 1024 sub-carriers.

The downlink and uplink frames are divided into different function portions. For example, the downlink frame includes a preamble, and FCH (frequency control header), a DL (downlink) MAP, a UL (uplink) MAP and DL data. The first symbol is the preamble which is typically used for such things as system acquisition, cell identification, handoff, timing and frequency tracking, and channel estimation. The symbols following the preamble contain control information about the rest of the frame. The symbols after the control data (FCH) is the downlink data symbols.

As previously described, an embodiment includes the mobile unit estimating spectral efficiency of received signals of different combinations receiver chains. One specific embodiment estimates an initial spectral efficiency during the preamble, and then augments the initial estimate during later portions (such as, the control information of the FCH and MAP, and then the downlink data) of the frame. The receiver chain selection (that is, which receiver chains are used to receive the wireless transmission signal) is made based on the initial spectral efficiency estimate of the preamble. The receive chain selection can change, however, during the frame as the spectral efficiency is augmented or refined over the duration of the frame. The preamble can be transmitted from a single antenna, whereas the downlink data can be transmitted from multiple antennas.

Figure 5:
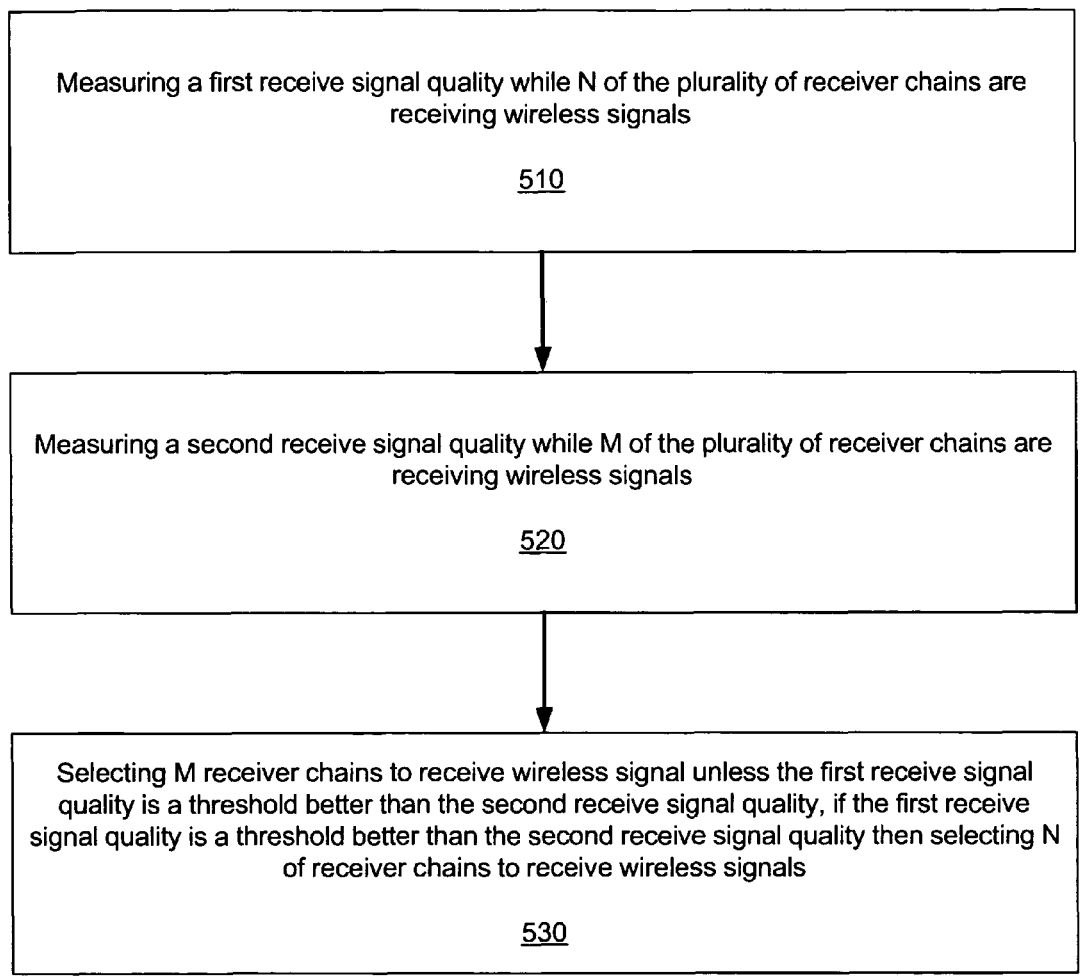
FIG. 5 is a flow chart that includes steps of one other example of a method of selecting receiver chains of a mobile unit to receive wireless signals.

FIG. 5 is a flow chart that includes steps of one other example of a method of selecting which of a plurality of receiver chains of a mobile unit to receive wireless signals. A first step 510 includes measuring a first receive signal quality while N of the plurality of receiver chains are receiving wireless signals. A second step 520 includes measuring a second receive signal quality while M of the plurality of receiver chains are receiving wireless signals. A third step 530 includes selecting M receiver chains to receive wireless signal unless the first receive signal quality is a threshold better than the second receive signal quality, if the first receive signal quality is a threshold better than the second receive signal quality then selecting N of receiver chains to receive wireless signals.

Figure 6:
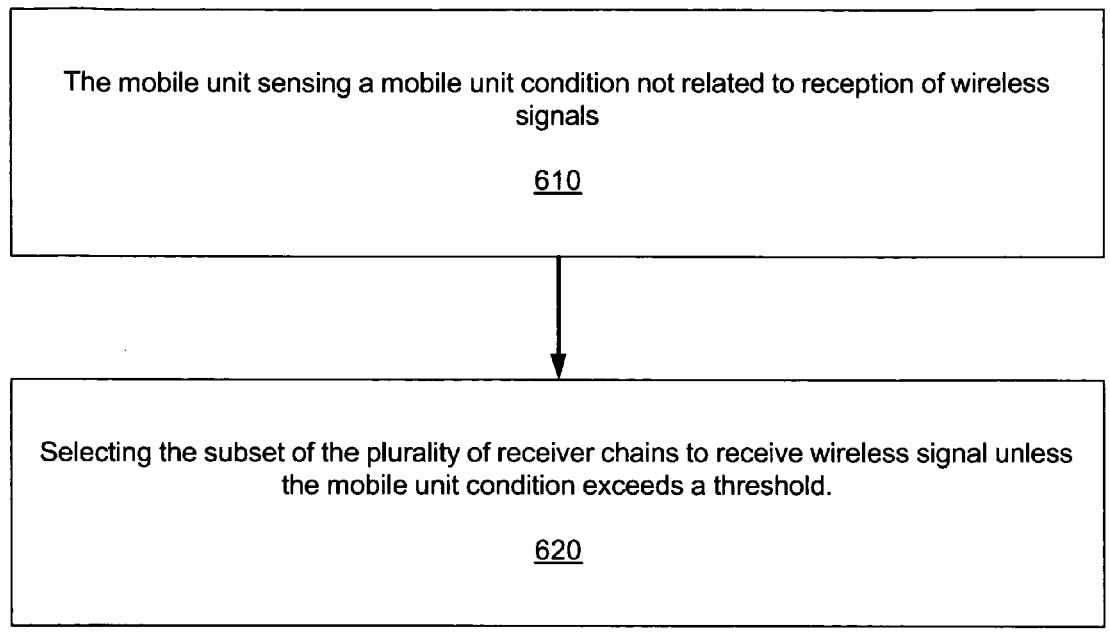
FIG. 6 is a flow chart that includes steps of one other example of a method of selecting receiver chains of a mobile unit to receive wireless signals.

FIG. 6 is a flow chart that includes steps of one other example of a method of selecting which of a plurality of receiver chains of a mobile unit to receive wireless signals. A first step 610 includes the mobile unit sensing a mobile unit condition not related to reception of wireless signals. A second step 620 includes selecting the subset of the plurality of receiver chains to receive wireless signal unless the mobile unit condition exceeds a threshold. If the threshold condition falls below the threshold then selecting all the plurality of receiver chains to receive wireless signals. The mobile unit condition can include a level of battery power available, or a temperature level of the mobile unit. If the battery power available fails below a threshold, or the temperature level is above a threshold, the mobile unit can select fewer receiver chains, and vice versa.

Although specific embodiments of the invention have been described and illustrated, the invention is not to be limited to the specific forms or arrangements of parts so described and illustrated. The invention is limited only by the appended claims.

What is claimed:

1. A method of selecting which of a plurality of receiver chains of a mobile unit to receive wireless signals, comprising:

measuring a first receive signal quality while all of the plurality of receiver chains are receiving wireless signals;

measuring a second receive signal quality while a subset of the plurality of receiver chains are receiving wireless signals;

selecting the subset of the plurality of receiver chains to receive wireless signals unless the first receive signal quality is a threshold better than the second receive signal quality; and selecting all the plurality of receiver chains to receive wireless signals if the first receive signal quality is the threshold better than the second receive signal quality.

2. The method of claim 1, wherein selecting the subset of the plurality of receiver chains to receive wireless signals unless the first receive signal quality is a threshold better than the second receive signal quality comprises:

determining a first modulation and coding format that can be supported by the first receive signal quality;

determining a second modulation and coding format that can be supported by the second receive signal quality;

determining the first receive signal quality is the threshold better than the second receive quality if a data throughput supported by the first modulation and coding format is a predetermined percentage greater than a data throughput supported by the second modulation and coding format.

3. The method of claim 1, wherein the threshold is dependent upon an estimated amount of battery power available to the mobile unit.

4. The method of claim 1, wherein the received wireless signals comprise frames, each frame comprising a preamble, and the first receive signal quality and the second receive signal quality are measured during the preamble.

5. The method of claim 4, further comprising refining the first and second signal qualities based on received symbols of the frame occurring after the preamble.

6. The method of claim 4, wherein the first receive signal quality and the second receive signal quality are measured once every k frames.

7. The method of claim 6, wherein the value of k is adaptively selected based on at least one channel characteristic.

8. The method of claim 1, wherein the mobile unit measures the first receive signal quality and the second receive signal quality, and the first receive signal quality and the second receive signal quality comprise at least one of CINR, CNR spectral efficiency, PER, BER, BLER, energy consumed per receive bit, and MAP error rate.

9. The method of claim 1, wherein the threshold is dependent on loading of a base station that is transmitting wireless signals that are received by the mobile unit.

10. The method of claim 1, wherein the threshold is dependent on CINR of the first receive signal quality.

11. The method of claim 1, wherein the threshold is dependent upon latency and throughput requirements of information of the received wireless signals.

12. The method of claim 1, wherein the threshold is dependent upon an estimation of energy consumed per bit for receiving wireless signals through all of the plurality of receiver chains and an estimation of energy consumed per bit for receiving wireless signals through the subset of the plurality of receiver chains.

13. The method of claim 1, further comprising a base station selecting all the plurality of receiver chains or the subset of receiver chains at the mobile unit.

14. The method of claim 13, wherein the mobile unit reports its remaining battery life to the base station.

15. The method of claim 14, wherein the mobile unit reports the remaining battery life through a control channel, wherein the control channel comprises a MAC header packet of the base station.

16. The method of claim 14, wherein the mobile unit reports the remaining battery life through a control channel, wherein the control channel comprises an application layer packet of a server associated with a network of the base station.

17. The method of claim 14, wherein the mobile unit periodically reports the remaining battery life to the base station through the control channel.

18. The method of claim 1, wherein the mobile unit activates only the subset of receiver chains unless a transmitting base station indicates that the transmitting base station has data to transmit to the mobile unit.

19. The method of claim 1, further comprising the mobile unit receiving a command from a transmitting base station that indicates to the mobile unit how many receiver chains to activate, and for how many frames of transmission of the wireless signals.

20. The method of claim 1, wherein if the mobile unit detects a handoff condition, the mobile unit selects all the plurality of receiver chains to receive wireless signals.

21. The method of claim 1, further comprising the mobile unit indicating to a transmitting base station how many of the plurality of receiver chains are receiving wireless signals.

22. The method of claim 1, further comprising the mobile unit reporting channel quality to the base station, and the base station selecting all or a subset of the receiver chains based on the reported channel quality.

23. The method of claim 1, further comprising: the mobile unit receiving a command from a transmitting base station; upon receiving the command, the mobile unit periodically selecting a preset multiple of receiver chains to receive wireless signals for a predetermined duration, over a predetermined interval.

24. A mobile unit, comprising:
a plurality of antennas; and
a plurality of receiver chains coupled to the plurality of antennas, wherein the mobile unit is configured to perform operations comprising:
measuring a first receive signal quality while all of the plurality of receiver chains are receiving wireless signals,
measuring a second receive signal quality while a subset of the plurality of receiver chains are receiving wireless signals,
selecting the subset of the plurality of receiver chains to receive wireless signals unless the first receive signal quality is a threshold better than the second receive signal quality, and
selecting all the plurality of receiver chains to receive wireless signals if the first receive signal quality is the threshold better than the second receive signal quality.

25. The mobile unit of claim 24, wherein selecting the subset of the plurality of receiver chains to receive wireless signals unless the first receive signal quality is a threshold better than the second receive signal quality comprises:
determining a first modulation and coding format that can be supported by the first receive signal quality;
determining a second modulation and coding format that can be supported by the second receive signal quality;
determining the first receive signal quality is the threshold better than the second receive quality if a data throughput supported by the first modulation and coding format is a predetermined percentage greater than a data throughput supported by the second modulation and coding format.

26. The mobile unit of claim 24, wherein if the mobile unit detects a handoff condition, the operations further comprise:
selecting all the plurality of receiver chains to receive wireless signals.

* * * * *